(12) United States Patent
Darcy et al.

(10) Patent No.: US 9,201,896 B2
(45) Date of Patent: Dec. 1, 2015

(54) MANAGING DISTRIBUTED STORAGE QUOTAS

(71) Applicant: Red Hat, Inc., Raleigh, NC (US)

(72) Inventors: Jeff Darcy, Lexington, MA (US); Kaleb Keithley, Belmont, MA (US)

(73) Assignee: Red Hat, Inc., Raleigh, NC (US)

( * ) Notice: Subject to any disclaimer, the term of this patent is extended or adjusted under 35 U.S.C. 154(b) by 153 days.

(21) Appl. No.: 13/685,500

(22) Filed: Nov. 26, 2012

(65) Prior Publication Data

US 2014/0149475 A1   May 29, 2014

(51) Int. Cl.
*G06F 17/30* (2006.01)

(52) U.S. Cl.
CPC .... *G06F 17/30194* (2013.01); *G06F 17/30283* (2013.01)

(58) Field of Classification Search
CPC .............. G06F 17/30194; G06F 17/30283
USPC ................ 707/827, 999.205, 999.01, 758
See application file for complete search history.

(56) References Cited

U.S. PATENT DOCUMENTS

| | | | |
|---|---|---|---|
| 5,446,737 A | 8/1995 | Cidon et al. | |
| 7,716,275 B1 | 5/2010 | Nagaralu et al. | |
| 7,953,701 B2 | 5/2011 | Okitsu et al. | |
| 8,931,054 B2* | 1/2015 | Huynh et al. | 726/3 |
| 2003/0182349 A1 | 9/2003 | Leong et al. | |
| 2004/0078532 A1 | 4/2004 | Tremaine | |
| 2006/0095907 A1 | 5/2006 | Barsness et al. | |
| 2007/0027941 A1 | 2/2007 | Becker-Szendy et al. | |
| 2007/0150551 A1* | 6/2007 | Krishnan et al. | 709/218 |
| 2007/0260842 A1* | 11/2007 | Faibish et al. | 711/170 |
| 2008/0103861 A1 | 5/2008 | Zhong | |
| 2008/0104605 A1 | 5/2008 | Steinder et al. | |
| 2008/0215450 A1 | 9/2008 | Gates et al. | |
| 2009/0210875 A1 | 8/2009 | Bolles et al. | |
| 2009/0222829 A1 | 9/2009 | Leong et al. | |
| 2009/0288084 A1* | 11/2009 | Astete et al. | 718/1 |
| 2010/0306163 A1 | 12/2010 | Beaty et al. | |
| 2011/0138147 A1 | 6/2011 | Knowles et al. | |
| 2011/0282839 A1* | 11/2011 | Paksoy et al. | 707/640 |
| 2012/0059985 A1 | 3/2012 | Devassy et al. | |
| 2012/0066541 A1 | 3/2012 | Dournov et al. | |
| 2012/0230649 A1 | 9/2012 | Craner et al. | |
| 2012/0263191 A1* | 10/2012 | Baron | 370/462 |
| 2013/0232179 A1* | 9/2013 | Chhaunker et al. | 707/827 |
| 2014/0032760 A1* | 1/2014 | Cohen et al. | 709/226 |
| 2014/0075029 A1* | 3/2014 | Lipchuk et al. | 709/226 |

OTHER PUBLICATIONS

Franz Farber, et al., An In-Memory Database System for Multi-Tenant Applications, 2011, Google Scholar, 650-666.*

* cited by examiner

*Primary Examiner* — Jean B Fleurantin
(74) *Attorney, Agent, or Firm* — Lowenstein Sandler LLP

(57) ABSTRACT

A processing device causes a plurality of storage servers to create tenant identifiers for a tenant of a multi-tenant distributed file system that is distributed over the plurality of storage servers, the plurality of storage servers having underlying local file systems that interface with the multi-tenant distributed file system. The processing device maps the tenant to the tenant identifiers. The processing device assigns a global storage quota to the tenant. The processing device divides the global storage quota into a plurality of local storage quotas and assigns a local storage quota of the plurality of local storage quotas to each storage server of the plurality of storage servers.

20 Claims, 6 Drawing Sheets

MANAGING DISTRIBUTED STORAGE QUOTAS

TECHNICAL FIELD

Embodiments of the invention relate generally to a distributed file system, and more specifically to managing quotas of the distributed file system.

BACKGROUND

Traditional disk file systems such as EXT3, EXT4, FAT32, XFS, NTFS, and so forth are installed on discrete data stores. Some network file systems such as GlusterFS® are layered file systems that layer on top of and interconnect multiple different instances of traditional file systems.

SUMMARY

In one example embodiment, a processing device causes a plurality of storage servers to create tenant identifiers for a tenant of a multi-tenant distributed file system that is distributed over the plurality of storage servers, the plurality of storage servers having underlying local file systems that interface with the multi-tenant distributed file system. The processing device maps the tenant to the tenant identifiers. The processing device assigns a global storage quota to the tenant. The processing device divides the global storage quota into a plurality of local storage quotas and assigns a local storage quota of the plurality of local storage quotas to each storage server of the plurality of storage servers.

BRIEF DESCRIPTION OF THE DRAWINGS

The present disclosure will be understood more fully from the detailed description given below and from the accompanying drawings of various implementations of the disclosure.

DETAILED DESCRIPTION

Described herein are a method and apparatus for setting up and managing distributed quotas for a distributed file system. The distributed file system may include multiple storage servers, each of which may control one or more storage resources, such as disks and/or memory. Each of the storage servers may use a local file system (e.g., a disk file system) to manage the storage of data on its storage resources. The distributed file system may layer on top of, and interface with, the local file systems. The distributed file system may be a multi-tenant file system that assigns global quotas to tenants. The global quotas are distributed quotas that control a maximum amount of storage space the tenant is permitted to use across all of the storage servers. The global storage quotas control the total amount of storage space that can be used by all users associated with that tenant. The distributed file system divides the global storage quota into a collection of local storage quotas, and assigns the local storage quotas to the storage servers. The storage servers use the local file systems to manage the local storage quotas. If any of the local storage quotas are exceeded or in danger of being exceeded, the storage server reports this to the distributed file system, which then determines how to reallocate use of the storage servers and/or local quotas on the storage servers.

Embodiments of the present invention provide a multi-tenant distributed file system that can micro-manage individual local storage quotas dynamically. This capability enables the file system to set and update both global storage quotas and local storage quotas on a per tenant basis, to adjust for real world operating conditions. For example, if a particular storage server becomes heavily used, the file system may automatically increase a local storage quota for that particular storage server and in parallel reduce local storage quotas for less used storage servers without adjusting a global storage quota that is assigned to a tenant. This may minimize an amount of administrative overhead that is used to manage tenants, and may reduce a number of spurious error messages or warning messages that are sent to users.

Throughout this text embodiments are described with reference to local file systems. It should be understood that the embodiments presented herein also work with block devices. For example, the distributed file system may be layered over a managed block device rather than a file system, and may interface with a block device manager such as a logical volume manager (LVM) rather than with the file system.

Figure 1:
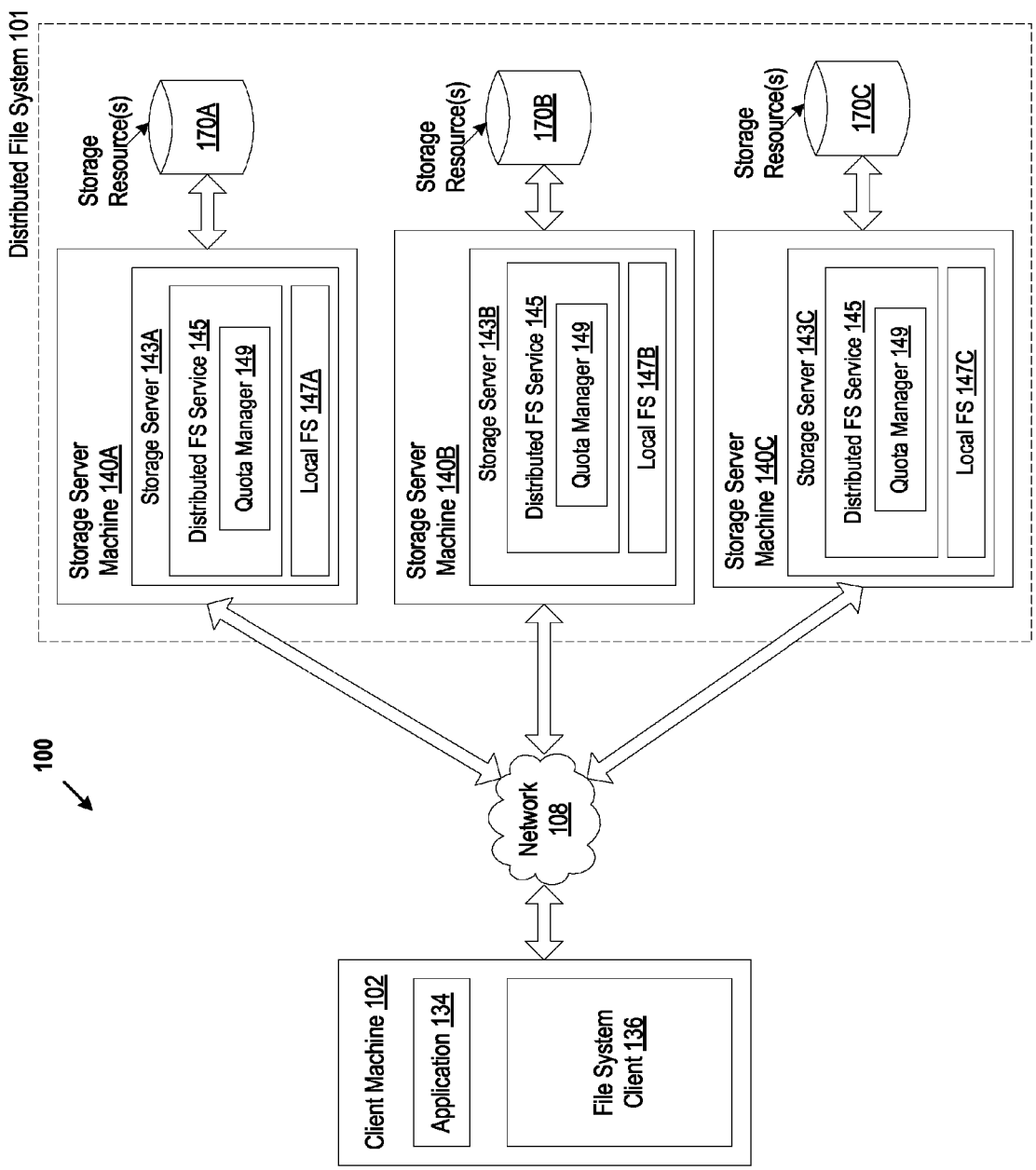
FIG. 1 illustrates an example system architecture having a distributed file system, in accordance with various implementations.

FIG. 1 is an example system architecture 100 for various implementations. The system architecture 100 can include a distributed file system 101 coupled to one or more client machines 102 via a network 108. The network 108 may be a public network (e.g., the Internet), a private network (e.g., a local area network (LAN) or wide area network (WAN), or a combination thereof. Network 108 can include a wireless infrastructure, which may be provided by one or multiple wireless communications systems, such as a wireless fidelity (WiFi) hotspot connected with the network 108 and/or a wireless carrier system that can be implemented using various data processing equipment, communication towers, etc.

The distributed file system 101 can be a network attached storage file system that includes one or more storage server machines 140A-C, each of which may control and any number of storage resources 170A-C. A storage server machine 140A-C can include a network-accessible server-based functionality (e.g., storage server 143A-C) or other data processing equipment. The storage server machines 140A-C can include, and are not limited to, any data processing device, such as a desktop computer, a laptop computer, a mainframe computer, a personal digital assistant, a rackmount server, a handheld device or any other device configured to process data. The storage server machines 140A-C of the distributed file system 101 may be grouped into one or more clusters. A cluster is a group of linked storage servers 143A-C working together closely.

The storage resources 170A-C may be mass storage devices, such as magnetic or optical storage based disks, solid-state drives (SSDs) or hard drives, coupled to the storage server machines 140A-B (either directly or via the network 108). The storage resources 170A-C may also include memory such as random access memory (RAM), Flash memory, and so forth. For convenience, some embodiments provided herein may be described with reference to disks or other mass storage devices. However, it should be understood that such embodiments may also apply to memory storage resources.

Storage servers 143A-C each host a local file system that manages the storage of data on storage resources 170A-C. Each of the storage resources 170A-C may be formatted in accordance with a particular local file system (FS) 147A-C. The local FS 147A-C may create directories, partitions, logical volumes, and so forth on the storage resources 170A-C as well as store data (e.g., files) thereon. Examples of local disk file systems that may be used on disk storage resources include EXT3, EXT4, XFS, NTFS, FAT16, FAT32, and so forth. Various flash file systems, tape file systems, optical disc file systems, memory files systems and so on may alternatively be used for other non-disk storage resources (e.g., for memory storage resources).

Storage servers 143A-C each additionally include an instance of a distributed file system (FS) service 145. The distributed FS service 145 interfaces with local file systems 147A-C to create directories on the storage resources 170A-C, as well as create tenant identifiers and associate the tenant identifiers to the directories. The distributed file system service 145 instances additionally interface with one another to form the distributed file system 101.

The distributed file system services 145, and thus the distributed file system 101, can store data as files and can include directories, also referred to as folders, which are virtual containers within the file system 101, in which groups of computer files and possibly other directories can be kept and organized. A sub-directory, also referred to as a sub-folder, is a directory contained inside another directory. The top-most directory is referred to as a root or top-level directory within the file system 101. Together, the directories form a hierarchy, or tree structure of one or more levels in the file system 101.

The distributed file system 101 can organize data (e.g., source files) in the disks 170A-C using volumes. A volume is a single accessible storage area of the file system 101, which can be resident on a single partition or directory of a hardware resource 170A-C (e.g., of a hard disk) of the file system 101. A volume can be a representation of a logical location, rather than a physical location, of a storage area in the file system 101. For example, a physical hard disk-1 may have two partitions, partition-1 and partition-2. A volume label "C:" may be assigned to partition-1 and a volume label "D:" may be assigned to partition-2. Hard disk-1 is a physical disk and "C:" and "D:" are volumes representing logical locations on physical hard disk-1. Additionally, the volume may be a collection of multiple logical and/or physical locations.

A mounted directory, also referred to as a brick, can be a basic unit of storage, represented by an export directory on a storage server 143A-C. A brick can be assigned to a volume. When a brick is processed, for example, by a translator, which can configure the brick, the brick becomes a sub-volume. A brick (sub-volume) can be described using a server identifier with an export directory identifier. One or more bricks (sub-volumes) can be added to a volume to increase the distribution of data amongst volumes and/or sub-volumes and to add to the capacity of the volume.

In one embodiment, the distributed file system 101 is a multi-tenant distributed file system, with multiple different tenants that each have access to separate volumes. A tenant may be a container for one or more groups of users. Accordingly, the distributed file system 101 may provide separate volumes to different tenants, where tenants only have access to their volume or volumes. Each disk 170A-C may include multiple different directories (e.g., multiple different bricks), and each such directory may be associated with a different tenant. A client machine 102 that mounts the file system 101 may be associated with a particular tenant. Accordingly, the volume (or volumes) of the file system 101 that the client machine 102 mounts are all also associated with that particular tenant. In one embodiment, a directory is generated for a tenant on each of the storage resources. These directories and any files and sub-directories of the directories may be included in the volume or volumes associated with the tenant.

Any number of client machines 102 can include a file system client 136 to communicate with the storage servers 143A-C in the file system 101. The client machine 102 may a computing device such as a server computer, a desktop computer, a set-top box, a gaming console, a television, a portable computing device such as, and not limited to, mobile telephones, personal digital assistants (PDAs), portable media players, netbooks, laptop computers, an electronic book reader and the like. The file system client 136 can mount the file system 101 via a mount point to access the data associated with a particular tenant in the file system 101. For example, the file system client 136 may be configured to mount the file system 101 using a volume identifier (e.g., volume label) and a file path that is stored in configuration data. Thus, the client machine may gain access to the volume of a particular tenant that the client machine is associated with, and may therefore gain access to the directories associated with that tenant on the storage resources 170A-C.

The client machines 102 can host one or more applications 134. An application 134 can be any type of application including, for example, a web application, a desktop application, a browser application, etc. An application 134 may request access (e.g., read, write, etc.) to the data in the file system 101 via the mount point and the file system client 136.

The distributed file system (FS) service 145 includes a quota manager 149. The quota manager 149 may assign a global quota to a particular tenant. The global quota controls the total amount of storage space that all users associated with a tenant, in the aggregate, are permitted to use. The size of the global quota may be based on how much storage a particular customer has purchased. For example, the customer may have purchased 90 GB of storage capacity. Thus, the quota manager 149 may assign a global storage quota of 90 GB to the tenant associated with that customer. The quota manager 149 may divide the global quota into a collection of local quotas. In the illustrated example file system 101, a 90 GB global quota may be divided evenly into three 30 GB local quotas. Alternatively, the global quota may be unevenly distributed into the local quotas (e.g., with a distribution of 10 GB, 20 GB and 60 GB). A local storage quota controls an amount of storage space that users associated with a tenant are permitted to use on a particular storage server.

Local file systems 147A-C may manage the local quotas, and may report to the quota manager 149 when any local quotas are exceeded. Quota manager 149 may in turn manage the global storage quota, and direct the local file systems 147A-C on how to handle any excess over a local storage quota. Implementations of the distributed FS service 145 are described in greater detail below in conjunction with FIG. 2.

Figure 2:
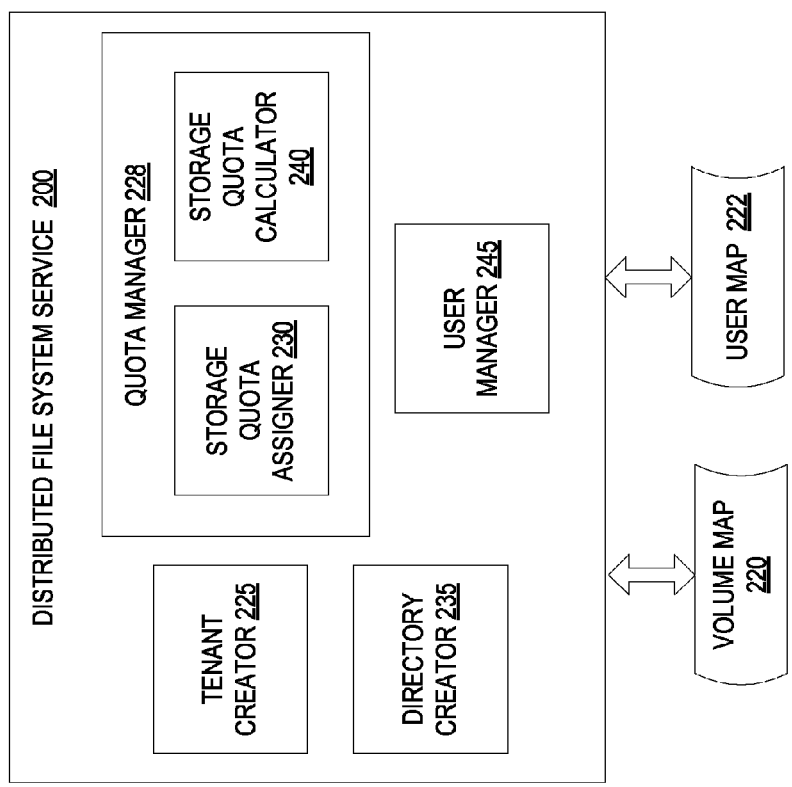
FIG. 2 is a block diagram of an implementation of a distributed file system service.

FIG. 2 illustrates a block diagram of one implementation of a distributed file system service 200. In one embodiment, distributed file system service 200 corresponds to distributed file system service 145 of FIG. 1. Distributed file system service 200 may include a tenant creator 225, a directory creator 235, a user manager 245 and a quota manager 228. The quota manager 228 may include a storage quota assigner 230 and a storage quota calculator 240. Alternatively, the functionality of one or more of the tenant creator 225, directory creator 235, quota manager 228 and user manager 245 may be combined into a single module or subdivided into multiple modules.

Tenant creator 225 creates and configures new tenants for a multi-tenant distributed file system. The multi-tenant distributed file system may be distributed across multiple storage servers, each of which may host a local file system that the distributed file system service 200 may interface with. In one embodiment, distributed file system service 200 interfaces with a local file system that is hosted by a storage server that also hosts the distributed file system service. To interface with other local file systems, the distributed file system service 200 may interface with other instances of the distributed file system service 200 that are collocated with those other local file systems.

As part of tenant creation, tenant creator 225 may create a unique global tenant identifier for a new tenant. Directory creator 235 may then interface with one or more local file systems (e.g., may interface with a collocated local file system, and with remote instances of the distributed file system service 200, which in turn interface with other local file systems) to cause those local file systems to create new directories. Each of the local file systems may also be directed to create a new local tenant identifier that is unique within that local file system. In one example, in which the local file systems are XFS file systems, a project identifier is used as the local tenant identifier. The local file system may then associate the created local tenant identifier (e.g., project identifier for the XFS file system) to the created directory. Directory creator 235 may report the local tenant identifiers used by each of the local file systems to tenant creator 225. Tenant creator 225 may then generate a volume map 220 that maps directories of local file systems and their associated local tenant identifiers to a volume, which is associated with the global tenant identifier of the tenant.

In an alternative embodiment, a directory may not be associated with a particular local tenant identifier. Instead, some files within one or more directory are individually associated with the local tenant identifier. Tenant creator 225 may map those files to a volume for the tenant. Other files included in the one or more directories that are not associated with the local tenant identifier may not be mapped to the volume.

As part of tenant configuration, the tenant creator 225 may assign a global storage quota to the tenant (and thus to the global tenant identifier). Quota manager 228 may take the global storage quota as an input, and storage quota calculator 240 may divide the global storage quota into a collection of local storage quotas. Storage quota calculator 240 may use multiple criteria to determine values to assign to the local storage quotas. For example, storage quota calculator 240 may analyze data usage patterns for other tenants to predict which storage servers are likely to be more heavily used. Storage quota calculator 240 may than distribute the global storage quota among the local storage quotas unevenly based on predicted use. For example, if 10 storage servers are included in the distributed file system and a global storage quota of 100 GB has been assigned, the storage quota calculator 240 may allocate a 15 GB local storage quota to four storage servers that are predicted to have heavy usage, a 10 GB storage quota to two storage servers that are predicted to have medium usage, and a 5 GB storage quota to four storage servers that are predicted to have light usage. Alternatively, storage quota calculator 240 may distribute the global storage quota among the local storage quotas evenly. For example, for a global storage quota of 100 GB to be divided among 10 storage servers, storage quota calculator 240 may allocate 10 GB to each of the local storage quotas.

Storage quota assigner 230 interfaces with the local file systems to assign the allocated local storage quotas to the storage servers hosting the local file systems. Each file system may use internal storage quota mechanisms and protocols to allocate the assigned local storage quota to the tenant identifier for the tenant. Each local file system may than monitor the storage space that is used on a particular storage server, and may send a report to quota manager 228 if the local storage quota is exceeded. In one embodiment, the local file systems use soft quotas rather than hard quotas. A soft quota is a quota that can be exceeded, and that causes a notification to be generated when the quota is exceeded. A hard quota, by contrast, is a quota that is not permitted to be exceeded. The use of soft quotas by the local file systems provides the distributed file system service 200 an ability to make decisions on how to address storage usage that goes over local storage quotas. In one embodiment, a timer is started when a soft quota is exceeded. If the soft quota is still exceeded when the time times out, the soft quota may be converted to a hard quota.

In addition to allocating and assigning global and local storage quotas for a tenant, quota manager 228 may dynamically adjust local storage quotas as usage conditions change. When quota manager 228 receives a notification that a local storage quota for a storage server has been exceeded, quota manager 228 determines whether any other storage servers are under utilized. A storage server is underutilized if the amount of storage used by that storage server in the distributed file system is lower than the local storage quota assigned to the storage server. If quota manager 228 identifies any underutilized storage servers, then storage calculator 240 may calculate how much to adjust the local storage quota for the storage server that has exceeded its quota as well as how much to adjust the local storage quotas of the underutilized storage servers. In one embodiment, storage quota calculator 240 decreases the local storage quotas of multiple storage servers if possible. That way the amount of reduction to any single local storage quota is minimized. Storage quota calculator 240 may then increase the storage quota of the storage server that exceeded its local storage quota. The increase may cause the local storage quota to no longer be exceeded. In one embodiment, the sum of the local storage quotas is equal to the global storage quota before and after the local storage quotas are modified.

Rather than adjusting storage quotas, quota manager 228 may also initiate the migration of data between storage servers to balance the storage utilization between those servers. For example, quota manager 228, after detecting that a storage server has exceeded its local quota, may cause that storage server to migrate some of its data to an underutilized storage server. This may cause that storage server to no longer exceed its storage quota. Such data migrations may also be performed prior to any storage server exceeding its storage quota. In some embodiments, a combination of strategies may be used to address exceeded local storage quotas. For example, some data may be moved, and some local storage quotas may be modified.

A tenant may be associated with a single user, but more often will be associated with an entity that can include multiple users. For example, a tenant may be associated with a small business, a division of a company, a college, or other organization that may include multiple different individuals. User manager 245 may associate users with a tenant, and may assign global user identifiers to those users. When that user authenticates itself to the distributed file system, distributed file system service 200 may identify that the user has a particular global user identifier, and that the global user identifier belongs to a particular tenant. Therefore, the distributed file system 200 may identify appropriate volumes to mount on a client device of the user that are associated with the global tenant identifier of the tenant.

Local file systems may be instructed to reserve pools of user identifiers for the users of a tenant. These pools may be ranges of user identifiers that are reserved for the tenant. For example, a local file system may reserve local user identifiers 0-999 for a tenant. When a user logs on to the distributed file system, user manager 245 requests local user identifiers from the pools, and assigns those local user identifiers to the global user identifier associated with that user. Accordingly, local user identifiers may be randomly assigned to users from the pools of user identifiers. Once a local user identifier has been assigned to a user, that local user identifier may be bound to that user (and to a particular tenant associated with that user). Accordingly, the local file systems may identify the user when he accesses information in the local file system in the future. User manager 245 may maintain a user map 222 that identifies which global user identifiers are associated with which global tenant identifiers and with which local user identifiers.

Note that a tenant may also be associated with multiple groups. Groups may be managed in the same manner as users. A group may be associated with multiple different users. Any discussion of users herein also applies to groups. For example, multiple global group identifiers may be created, which may be dynamically associated with local group identifiers.

Figure 3:
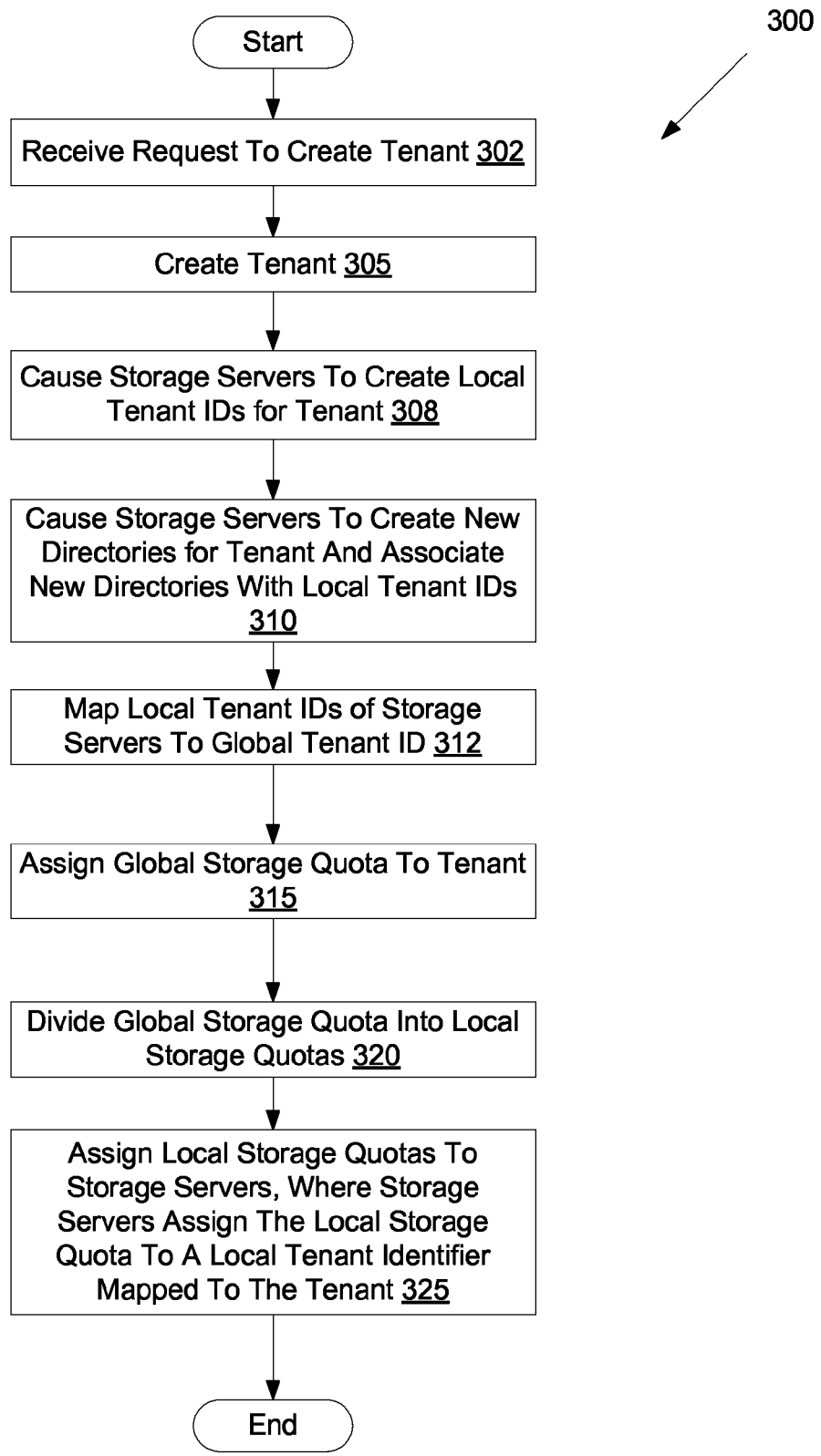
FIG. 3 is a flow diagram illustrating an implementation for a method for setting up a distributed quota for a distributed file system.
Figure 4:
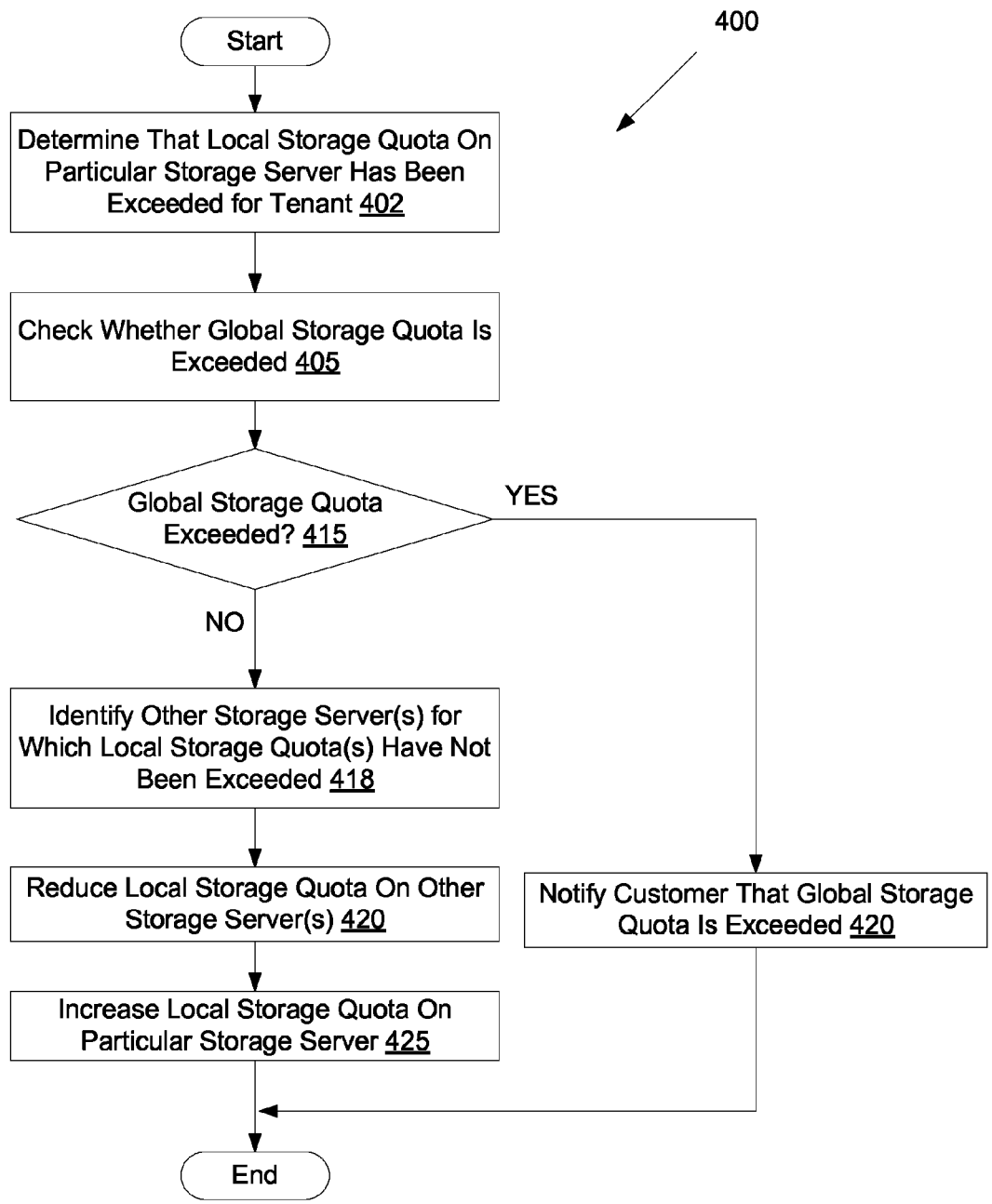
FIG. 4 is a flow diagram illustrating an implementation for a method for managing a distributed quota for a distributed file system.
Figure 5:
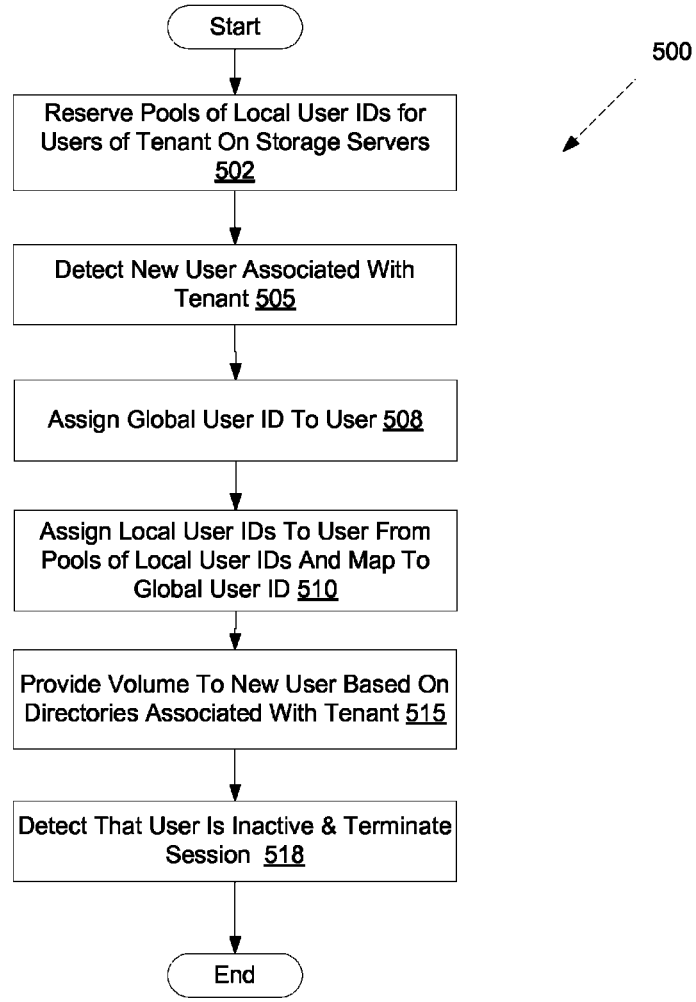
FIG. 5 is a flow diagram illustrating an implementation for a method for managing users of a distributed file system.

FIGS. 3-5 are flow diagrams showing various methods for managing quotas of a multi-tenant distributed file system. The methods may be performed by a computing device that may comprise hardware (e.g., circuitry, dedicated logic, programmable logic, microcode, etc.), software (e.g., instructions run on a processing device to perform hardware simulation), or a combination thereof. In one embodiment, at least some operations of the methods are performed by a distributed file system service 200 of FIG. 2.

FIG. 3 is a flow diagram illustrating one embodiment of a method 300 for setting up a distributed quota for a distributed file system. At block 302 of method 300, processing logic receives a request to create a new tenant. At block 305, processing logic creates a new tenant, which includes creating a new unique global tenant identifier. At block 308, processing logic causes storage servers to create local tenant identifiers (IDs) for the tenant.

At block 310, processing logic causes the storage servers to create new directories for the tenant, and to associate the new directories with the local tenant identifiers. Each storage server may generate a local tenant identifier that is unique within that storage server. In one embodiment, one or more of the storage servers use a local XFS file system, and the local tenant identifiers on these storage servers are project identifiers of the XFS file system. The new directories may be root directories or other directories. A new directory on a storage server may be associated with the local tenant identifier generated on that storage server by adding a tag to the directory, where the tag indicates the local tenant identifier. Any sub-directories that are created in that directory, as well as any files that are stored in that directory or its sub-directories, may also inherit the tag. Accordingly, all such sub-directories and files are also associated with the local tenant identifier.

At block 312, processing logic receives the local tenant identifiers from the storage servers, and maps the local tenant identifiers of the storage servers to the global tenant identifier for the tenant. Therefore, all of the directories and data that is associated with the local tenant identifiers may be added to a volume that can be mounted on client computing devices of users associated with the tenant.

At block 315, processing logic assigns a global storage quota to the tenant. At block 320, processing logic divides the global storage quota into a collection of local storage quotas. The sum of the local storage quotas may be equal to the global storage quota in one embodiment. At block 325, processing logic assigns the local storage quotas to the storage servers. The storage servers may then assign the local storage quota to the local tenant identifier mapped to the tenant. The storage servers may then use local file systems to monitor used storage space and to determine whether the local storage quotas are exceeded.

FIG. 4 is a flow diagram illustrating an implementation for a method 400 for managing a distributed (global) quota for a distributed file system. At block 402 of method 400, processing logic determines that a local storage quota on a particular storage server has been exceeded for a tenant. That tenant may be assigned that local storage quota, as well as a global storage quota and multiple other local storage quotas, where each local storage quota is associated with a different storage server.

At block 405, processing logic checks whether the global storage quota for the tenant has been exceeded. At block 415, if the global storage quota has been exceeded, the method proceeds to block 420, and processing logic notifies a customer that they have exceeded their storage quota (have exceeded the global storage quota). If the global storage quota has not been exceeded, the method continues to block 418.

At block 418, processing logic identifies other storage servers for which the local storage quotas have not been exceeded. At block 420, processing logic reduces the local storage quotas for one or more of those identified other storage servers. At block 425, processing logic increases the local storage quota for the particular storage server that had exceeded its local storage quota. Note that additionally, or alternatively, data may be moved between storage servers if the global storage quota is not exceeded.

FIG. 5 is a flow diagram illustrating an implementation for a method 500 for managing users of a distributed file system. At block 502 of method 500, processing logic reserves a pool of local user identifiers for users of a tenant on storage servers. At block 505, processing logic detects a new user associated with a tenant.

At block 508, processing logic assigns a global user identifier to the user. At block 510, processing logic assigns local user identifiers to the user from the pools of local user identifiers. Processing logic may then map the assigned local user identifiers to the global user identifier. The local user identifiers may be used to identify activity of the user on the storage servers during a particular session to the distributed file system.

Each storage server may have a dedicated directory that has been assigned a local tenant identifier that is mapped to a global tenant identifier of the tenant. The pools of user identifiers may be mapped to the local tenant identifiers. Accordingly, any user identifiers from the pools of user identifiers, when assigned to a user, may identify that user to the storage server as being associated with the tenant. At block 515, processing logic provides a volume to the new user based on directories of the storage servers associated with the tenant. Each local tenant identifier associated with the local user identifier assigned to the user on a storage server may be used to identify which directories of that storage server should be mapped to the volume provided to the new user.

At block 518, processing logic detects that the user is inactive and/or that the user has logged off of the distributed file system. Processing logic may accordingly terminate a session associated with that user.

Figure 6:
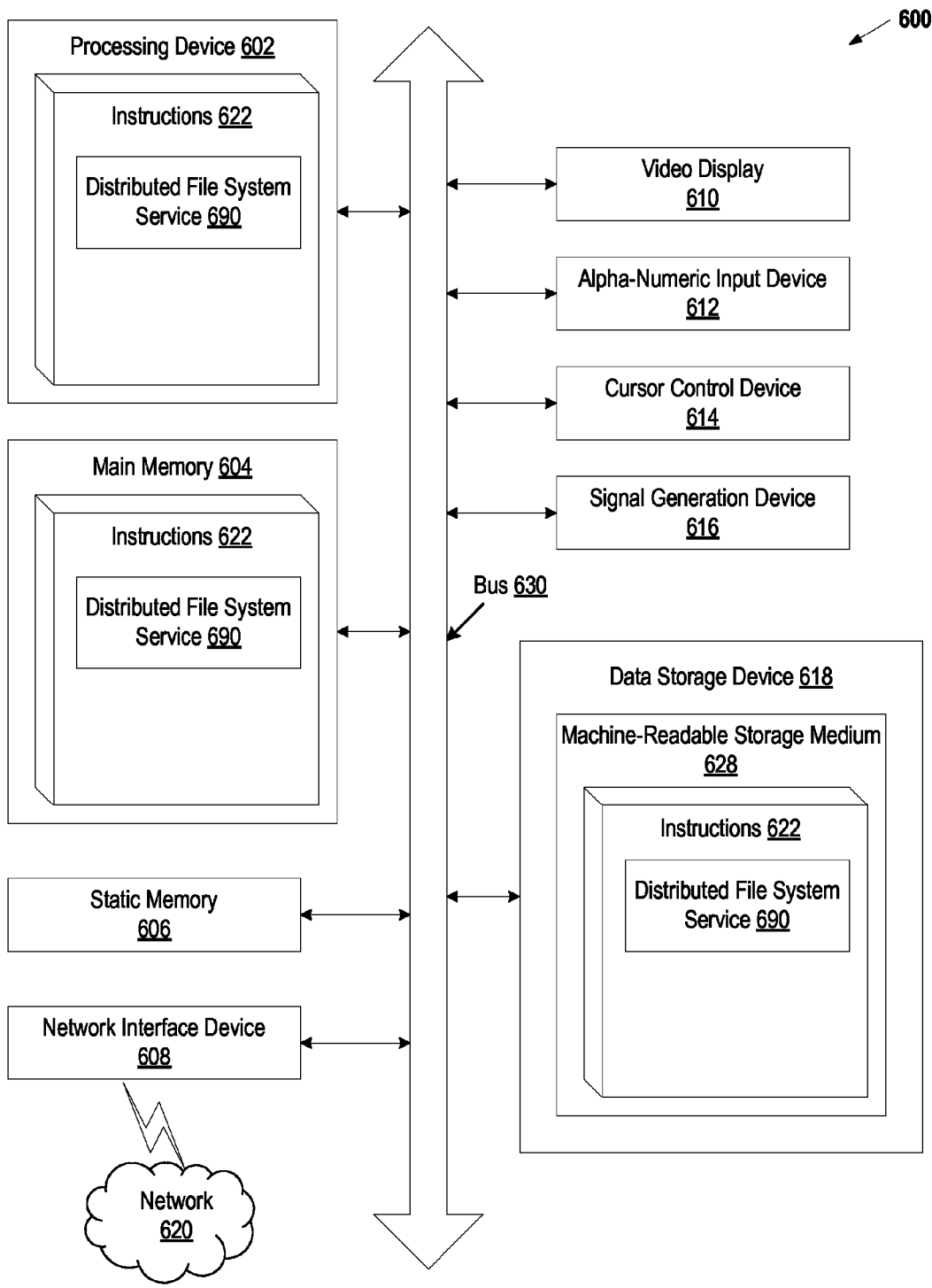
FIG. 6 is a block diagram of an example computer system that may perform one or more of the operations described herein.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. The processing device 602 is configured to execute instructions 622 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-readable storage medium 628 (also known as a computer-readable medium) on which is stored one or more sets of instructions or software 622 embodying any one or more of the methodologies or functions described herein. The instructions 622 may also reside, completely or at least partially, within the main memory 604 and/or within the processing device 602 during execution thereof by the computer system 600, the main memory 604 and the processing device 602 also constituting machine-readable storage media.

In one implementation, the instructions 622 include instructions for a distributed file system service (e.g., distributed file system service 200 of FIG. 2) and/or a software library containing methods that call a distributed file system service or modules thereof. While the machine-readable storage medium 628 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "causing" or "mapping" or "assigning" or "dividing" or "making" or "reducing" or "increasing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
   creating a global tenant identifier for a tenant of a multi-tenant distributed file system that is distributed over a plurality of storage servers;
   causing, by a processing device, the plurality of storage servers to create local tenant identifiers for the tenant of the multi-tenant distributed file system, the plurality of storage servers having underlying local file systems that interface with the multi-tenant distributed file system, wherein each storage server of the plurality of storage servers comprises one or more distinct directories for the tenant in the local file system of the storage server and one or more distinct local tenant identifiers for the tenant that are associated with the one or more distinct directories;
   mapping, by the processing device, the global tenant identifier to the local tenant identifiers;
   assigning, by the processing device, a global storage quota to the tenant;
   dividing, by the processing device, the global storage quota into a plurality of local storage quotas;
   assigning a local storage quota of the plurality of local storage quotas to each storage server of the plurality of storage servers; and
   creating, for the tenant, a volume comprising the one or more distinct directories in view of identification of the one or more distinct local tenant identifiers for the tenant that are associated with the one or more distinct directories.

2. The method of claim 1, further comprising:
   causing each storage server of the plurality of storage servers to create a directory for the tenant and to assign the directory to a local tenant identifier created by that storage server for the tenant.

3. The method of claim 1, further comprising:
   making modifications to two or more local storage quotas of the plurality of local storage quotas, wherein a sum of the plurality of local storage quotas is equal to the global storage quota before and after the modifications; and
   causing two or more storage servers of the plurality of storage servers to implement the modifications to the two or more local storage quotas.

4. The method of claim 1, further comprising:
   detecting that a particular local storage quota of the plurality of local storage quotas assigned to a particular storage server of the plurality of storage servers has been exceeded;
   identifying one or more other storage servers of the plurality of storage servers that have not exceeded assigned local storage quotas of the plurality of local storage quotas;
   reducing the assigned storage quotas assigned to the one or more other storage servers; and
   increasing the particular local storage quota on the particular storage server to cause the particular local storage quota to no longer be exceeded.

5. The method of claim 1, further comprising:
   detecting that a particular local storage quota of the plurality of local storage quotas assigned to a particular storage server of the plurality of storage servers has been exceeded;
   identifying one or more other storage servers of the plurality of storage servers that have not exceeded assigned local storage quotas of the plurality of local storage quotas; and
   moving data from the particular storage server to the one or more other storage servers.

6. The method of claim 1, further comprising:
   reserving a pool of local user identifiers for users associated with the tenant on each of the plurality of storage servers;
   responsive to detecting a user associated with the tenant, causing each of the plurality of storage servers to assign a local user identifier from the pool of local user identifiers to the user; and
   mapping the assigned local user identifiers to a global user identifier for the user.

7. The method of claim 1, further comprising:
   providing the volume to a computing device associated with the global tenant identifier.

8. A non-transitory computer readable storage medium having instructions that, when executed by a processing device, cause the processing device to:
   create a global tenant identifier for a tenant of a multi-tenant distributed file system that is distributed over a plurality of storage servers;
   cause, by the processing device, the plurality of storage servers to create local tenant identifiers for the tenant of the multi-tenant distributed file system, the plurality of storage servers having underlying local file systems that interface with the multi-tenant distributed file system, wherein each storage server of the plurality of storage servers comprises one or more distinct directories for the tenant in the local file system of the storage server and one or more distinct local tenant identifiers for the tenant that are associated with the one or more distinct directories;
   map, by the processing device, the global tenant identifier to the local tenant identifiers;
   assign, by the processing device, a global storage quota to the tenant;
   divide, by the processing device, the global storage quota into a plurality of local storage quotas;
   assign a local storage quota of the plurality of local storage quotas to each storage server of the plurality of storage servers; and
   create, for the tenant, a volume comprising the one or more distinct directories in view of identification of the one or more distinct local tenant identifiers for the tenant that are associated with the one or more distinct directories.

9. The non-transitory computer readable storage medium of claim 8, wherein to assign the local storage quota, the processing device is to:
cause the storage server to assign the local storage quota to a local tenant identifier created by that storage server for the tenant.

10. The non-transitory computer readable storage medium of claim 8, wherein the instructions further cause the processing device to:
make modifications to two or more local storage quotas of the plurality of local storage quotas, wherein a sum of the plurality of local storage quotas is equal to the global storage quota before and after the modifications; and
cause two or more storage servers of the plurality of storage servers to implement the modifications to the two or more local storage quotas.

11. The non-transitory computer readable storage medium of claim 8, wherein the instructions further cause the processing device to:
detect that a particular local storage quota of the plurality of local storage quotas assigned to a particular storage server of the plurality of storage servers has been exceeded;
identify one or more other storage servers of the plurality of storage servers that have not exceeded assigned local storage quotas of the plurality of local storage quotas;
reduce the assigned storage quotas assigned to the one or more other storage servers; and
increase the particular local storage quota on the particular storage server to cause the particular local storage quota to no longer be exceeded.

12. The non-transitory computer readable storage medium of claim 8, wherein the instructions further cause the processing device to:
detect that a particular local storage quota of the plurality of local storage quotas assigned to a particular storage server of the plurality of storage servers has been exceeded;
identify one or more other storage servers of the plurality of storage servers that have not exceeded assigned local storage quotas of the plurality of local storage quotas; and
move data from the particular storage server to the one or more other storage servers.

13. The non-transitory computer readable storage medium of claim 8, wherein the instructions further cause the processing device to:
reserve a pool of local user identifiers for users associated with the tenant on each of the plurality of storage servers;
responsive to detecting a user associated with the tenant, cause each of the plurality of storage servers to assign a local user identifier from the pool of local user identifiers to the user; and
map the assigned local user identifiers to a global user identifier for the user.

14. The non-transitory computer readable storage medium of claim 8, wherein a local file system on one or more of the plurality of storage servers comprises an XFS file system.

15. The non-transitory computer readable storage medium of claim 8, wherein the instructions further cause the processing device to:
provide the volume to a computing device associated with the global tenant identifier.

16. A computing device comprising:
a memory; and
a processing device coupled to the memory, the processing device to:
create a global tenant identifier for a tenant of a multi-tenant distributed file system that is distributed over a plurality of storage servers;
cause the plurality of storage servers to create local tenant identifiers for the tenant of the multi-tenant distributed file system, the plurality of storage servers having underlying local file systems that interface with the multi-tenant distributed file system, wherein each storage server of the plurality of storage servers comprises one or more distinct directories for the tenant in the local file system of the storage server and one or more distinct local tenant identifiers for the tenant that are associated with the one or more distinct directories;
map the global tenant identifier to the local tenant identifiers;
assign a global storage quota to the tenant;
divide the global storage quota into a plurality of local storage quotas;
assign a local storage quota of the plurality of local storage quotas to each storage server of the plurality of storage servers; and
create, for the tenant, a volume comprising the one or more distinct directories in view of identification of the one or more distinct local tenant identifiers for the tenant that are associated with the one or more distinct directories.

17. The computing device of claim 16, the processing device further to:
detect that a particular local storage quota of the plurality of local storage quotas assigned to a particular storage server of the plurality of storage servers has been exceeded;
identify one or more other storage servers of the plurality of storage servers that have not exceeded assigned local storage quotas of the plurality of local storage quotas;
reduce the assigned storage quotas assigned to the one or more other storage servers; and
increase the particular local storage quota on the particular storage server to cause the particular local storage quota to no longer be exceeded.

18. The computing device of claim 16, the processing device further to:
cause a storage server to assign the local storage quota to a local tenant identifier created by that storage server for the tenant; and
cause the storage server to create a directory for the tenant and to assign the directory to the local tenant identifier created by the storage server for the tenant.

19. The computing device of claim 16, the processing device further to:
detect that a particular local storage quota of the plurality of local storage quotas assigned to a particular storage server of the plurality of storage servers has been exceeded;
identify one or more other storage servers of the plurality of storage servers that have not exceeded assigned local storage quotas of the plurality of local storage quotas; and
move data from the particular storage server to the one or more other storage servers.

20. The computing device of claim 16, the processing device further to:
provide the volume to a computing device associated with the global tenant identifier.

* * * * *